US011863401B2

(12) United States Patent
Pandian et al.

(10) Patent No.: US 11,863,401 B2
(45) Date of Patent: Jan. 2, 2024

(54) VISUALIZATION SYSTEM FOR PRIVATE NETWORKS AND DEVICES

(71) Applicant: Ordr Inc., Santa Clara, CA (US)

(72) Inventors: Gnanaprakasam Pandian, Cupertino, CA (US); Harsha Vardhan Ramasamy, Santa Clara, CA (US); Krishna Kumar Vavilala, Bangalore (IN); Vivekanandan Vinayagam, San Ramon, CA (US); Vijayaraghavan Doraiswami, Santa Clara, CA (US); Sheausong Yang, Saratoga, CA (US)

(73) Assignee: Ordr Inc., Santa Clara, CA (US)

( * ) Notice: Subject to any disclaimer, the term of this patent is extended or adjusted under 35 U.S.C. 154(b) by 0 days.

(21) Appl. No.: 17/181,250

(22) Filed: Feb. 22, 2021

(65) Prior Publication Data

US 2022/0272005 A1    Aug. 25, 2022

(51) Int. Cl.
*H04L 41/22* (2022.01)
*H04L 61/5014* (2022.01)
*H04L 41/12* (2022.01)
*H04L 43/045* (2022.01)
*H04L 45/02* (2022.01)

(52) U.S. Cl.
CPC ............ *H04L 41/22* (2013.01); *H04L 41/12* (2013.01); *H04L 61/5014* (2022.05); *H04L 43/045* (2013.01); *H04L 45/02* (2013.01)

(58) Field of Classification Search
CPC ..... H04L 43/045; H04L 63/102; H04L 41/12; H04L 41/22; H04L 45/02; H04L 61/2015; H04L 63/1408; H04L 61/5014; H04W 84/18
See application file for complete search history.

(56) References Cited

U.S. PATENT DOCUMENTS

| 5,926,180 A | 7/1999 | Shimamura |
| 6,271,845 B1 | 8/2001 | Richardson |
| 6,850,486 B2 | 2/2005 | Saleh et al. |

(Continued)

FOREIGN PATENT DOCUMENTS

| EP | 2372954 A2 * | 10/2011 | ............ H04L 12/66 |
| WO | WO-2021108652 A1 * | 6/2021 | ............ H04L 41/08 |

OTHER PUBLICATIONS

Miettinen el al., "IOT SENTINEL: Automated Device-Type Identification for Security Enforcement in IoT" 2017 IEEE 37th International Conference on Distributed Computing Systems (ICDCS), Atlanta, GA, 2017, doi: 10.1109/ICDCS.2017.283.2017, pp. 2177-2184. (Year: 2017).

*Primary Examiner* — John M Macilwinen
*Assistant Examiner* — Rachel J Hackenberg
(74) *Attorney, Agent, or Firm* — Invoke

(57) ABSTRACT

Techniques are disclosed for generating a combined visual representation of subsets of devices associated with corresponding sub-networks of a private network, where at least two devices in corresponding sub-networks share a same private internet protocol (IP) address. The system generates a separate profile for each device using a combination of elements including at least (a) a private IP address corresponding to the device and (b) a network identifier corresponding to a sub-network associated with the device. These sub-networks and their constituent devices may be visually represented in corresponding user interface elements.

19 Claims, 6 Drawing Sheets

(56) References Cited

U.S. PATENT DOCUMENTS

| | | | |
|---|---|---|---|
| 8,185,824 B1 | 5/2012 | Mitchell et al. | |
| 8,332,782 B1 | 12/2012 | Chang et al. | |
| 8,631,459 B2 | 1/2014 | Choi et al. | |
| 9,003,292 B2* | 4/2015 | Smith | H04L 43/50 |
| | | | 715/737 |
| 10,044,745 B1 | 8/2018 | Jones et al. | |
| 10,320,619 B2* | 6/2019 | Seddigh | H04L 41/12 |
| 10,594,576 B2* | 3/2020 | Cavuto | H04L 43/106 |
| 10,735,269 B2* | 8/2020 | Wilson | H04L 61/2007 |
| 10,999,100 B2* | 5/2021 | Cidon | H04L 43/065 |
| 2002/0042750 A1 | 4/2002 | Morrison | |
| 2006/0052998 A1 | 3/2006 | Michelman | |
| 2007/0109975 A1 | 5/2007 | Reckamp et al. | |
| 2010/0312875 A1* | 12/2010 | Wilerson | H04L 61/1511 |
| | | | 709/224 |
| 2013/0047113 A1 | 2/2013 | Hume et al. | |
| 2013/0058346 A1* | 3/2013 | Sridharan | H04L 45/586 |
| | | | 370/392 |
| 2013/0064159 A1 | 3/2013 | Edwards | |
| 2013/0101291 A1 | 4/2013 | Wittenschlaeger | |
| 2014/0157422 A1 | 6/2014 | Livshits et al. | |
| 2015/0009859 A1 | 1/2015 | Inao et al. | |
| 2015/0163121 A1 | 6/2015 | Mahaffey et al. | |
| 2016/0099963 A1 | 4/2016 | Mahaffey et al. | |
| 2016/0337204 A1 | 11/2016 | Dubey et al. | |
| 2017/0163502 A1 | 6/2017 | MacNeil et al. | |
| 2018/0034655 A1 | 2/2018 | Christopher et al. | |
| 2018/0113581 A1* | 4/2018 | Makovsky | H04L 67/18 |
| 2018/0121032 A1 | 5/2018 | Naous et al. | |
| 2018/0121907 A1 | 5/2018 | Chisholm et al. | |
| 2018/0182137 A1 | 6/2018 | Pushpoth et al. | |
| 2018/0225592 A1 | 8/2018 | Ponnuswamy | |
| 2018/0234310 A1* | 8/2018 | Ingalls | H04L 41/22 |
| 2018/0329794 A1* | 11/2018 | Prieto | G06F 11/3006 |
| 2018/0359244 A1 | 12/2018 | Cockerill et al. | |
| 2019/0028289 A1 | 1/2019 | Saxena et al. | |
| 2019/0188389 A1 | 6/2019 | Peled et al. | |
| 2019/0319926 A1 | 10/2019 | Cummins et al. | |
| 2020/0007411 A1 | 1/2020 | Arar et al. | |
| 2020/0137115 A1* | 4/2020 | Janakiraman | H04L 43/028 |
| 2021/0051118 A1* | 2/2021 | Wang | H04L 49/552 |
| 2021/0328877 A1* | 10/2021 | Jung | H04L 41/12 |
| 2021/0352019 A1* | 11/2021 | J S | H04L 45/38 |
| 2022/0014441 A1* | 1/2022 | Sethi | H04L 41/40 |

\* cited by examiner

FIG. 4

| Network Domains List | | | |
|---|---|---|---|
| No. | Domain ID | Short Name | Long Name |
| 1 | A | HQ | Head Quarters |
| 2 | B | DC | Distribution Center San Jose |
| 3 | C | BLR | Bangalore India System Modeling |

Sensor Network Domain Rules

IP / Sub-Network ID     Sub-Network Short Name
   192.168.0.0 / 16            HQ
   10.200.0.0 / 16             HQ
   10.30.0.0 / 18              DC 504   508   512

500

FIG. 6
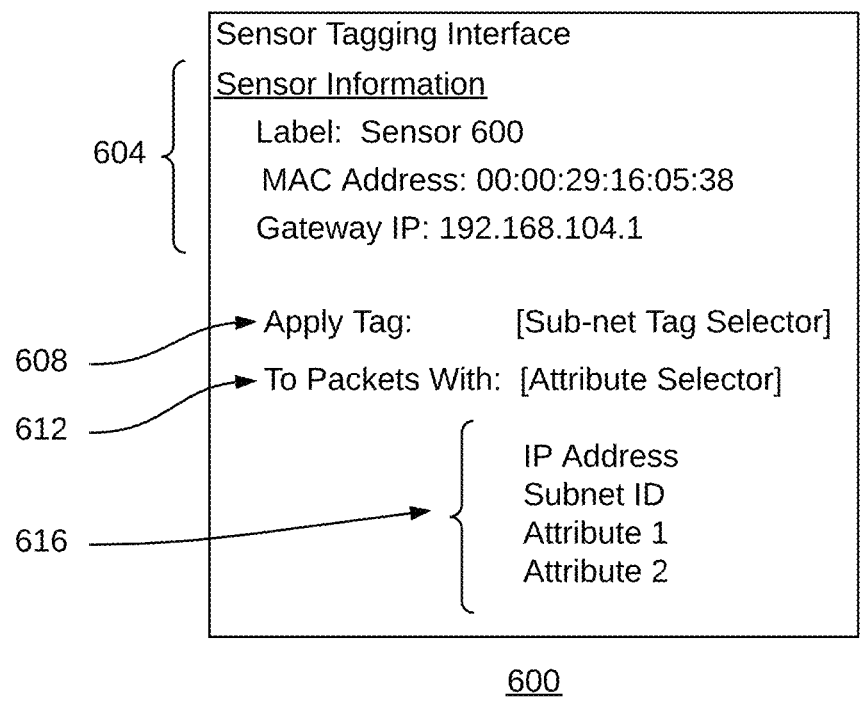
600
FIG. 7A
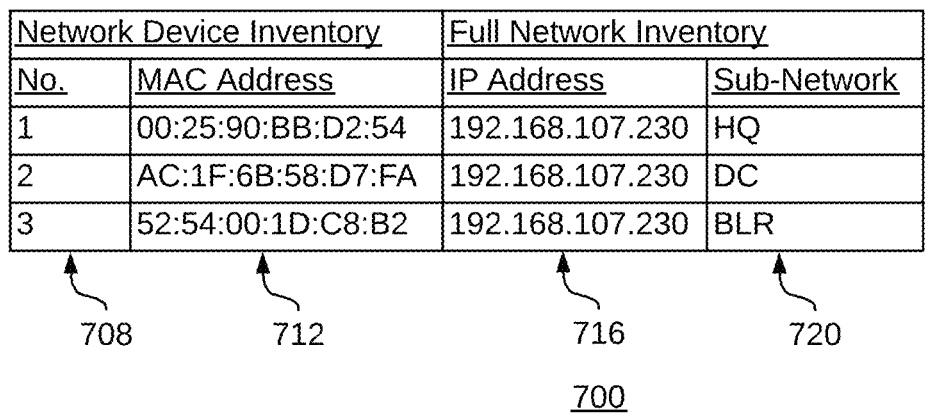
700
FIG. 7B
| Sub-Network Device Inventory | | Subnet: BLR | |
|---|---|---|---|
| No. | MAC Address | IP Address | Sub-Network |
| 1 | 52:54:00:1D:C8:B2 | 192.168.107.230 | BLR |
704

VISUALIZATION SYSTEM FOR PRIVATE NETWORKS AND DEVICES

TECHNICAL FIELD

The present disclosure relates to managing private networks. In particular, the present disclosure relates to a visualization system for viewing device attributes for devices connected to a private network.

BACKGROUND

An internet protocol (IP) address is a number assigned to a device using the Internet Protocol to communicate with a network. The IP address enables communications to be routed properly to and from the device via various network appliances, such as servers, switches, and routers. The IP address may also be used for other functions, such as identifying distinct devices connected to a network. Some administration functions of a network (e.g., maintaining an inventory of devices and performing auditing functions) may use IP addresses of devices.

IP addresses may be assigned to devices directly connected to the Internet, such as access servers and routers (generically, "gateways"). For these types of Internet-connected devices, IP addresses are administered by the Internet Assigned Numbers Authority (IANA) and are generally unique to avoid mis-addressing and/or mis-routing transmissions.

In some examples, these "gateway" devices act as interfaces between the Internet and a private network, the latter of which restricts access to a limited set of approved users. Many of the devices connected to a private network communicate only with other devices connected to the private network, and therefore do not require a globally unique IP address. Instead, private networks assign and administer private IP addresses that are unique only to the private network.

While private IP addresses are convenient, complications may arise when different private networks are merged (e.g., as with a corporate merger of organizations or merging of branch or office networks within an organization) or when a population of devices that connect to a network changes (e.g., in a coworking environment). In some cases private IP addresses may overlap when a portion of a private network is managed by a separate vendor. In some cases, there may be duplication of private IP addresses between the two (or more) merged networks where different devices share a same IP address.

Network systems often deploy features that may properly route transmissions within private networks despite duplicate private IP addresses. Virtual routing and forwarding ("VRF") and network address translation ("NAT") are two examples of techniques that may be deployed to avoid disruptions to private network communications due to duplicated private IP addresses. These solutions, however, are applied to transmissions at the network layer of the TCP/IP protocol. There remains a need to address non-network layer related challenges posed by networks that include devices with duplicated private IP addresses.

For example, VRF and NAT do not solve difficulties posed by duplicated private IP addresses that are associated with network administration. Examples of network administration tasks that use private IP addresses include generating and maintaining device inventories, software license auditing, security auditing, and other policy compliance tasks. Identifying duplicate private IP addresses for one or more private networks may often involve laborious and time consuming processes that include manual analysis of network design diagrams and device inventory lists.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 is a schematic illustration of a user interface element in a network visualization system that identifies separate sub-networks within a common private network environment in accordance with one or more embodiments;

FIG. 5 is a schematic illustration of a user interface element in a network visualization system that provides detailed sub-network information for sub-networks within a common private network environment in accordance with one or more embodiments;

FIG. 6 is a schematic illustration of a user interface element in a network visualization system that enables a user to select a sub-network identifier tag to be applied to packets detected by a particular sensor or packets having particular profile attributes in accordance with one or more embodiments;

FIG. 7A is a schematic illustration of a user interface element in a network visualization system that identifies device attributes and their corresponding sub-networks in accordance with one or more embodiments;

FIG. 7B is a schematic illustration of a user interface element in a network visualization system that identifies all devices and corresponding devices attributes associated with a particular sub-network in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING AND DISPLAYING A COMBINED VISUAL REPRESENTATION OF A NETWORK WITH MULTIPLE CONSTITUENT SUB-NETWORKS
4. EXAMPLE EMBODIMENTS
5. COMPUTER NETWORKS AND CLOUD NETWORKS
6. MISCELLANEOUS; EXTENSIONS
7. HARDWARE OVERVIEW

1. General Overview

One or more embodiments generate a combined visual representation of subsets of devices associated with corresponding sub-networks of a private network, where at least two devices in corresponding sub-networks share a same private internet protocol (IP) address.

The system generates a separate profile for each device using a combination of elements including at least (a) a private IP address corresponding to the device and (b) a network identifier corresponding to a sub-network associated with the device. The use of the combination of elements results in generating different profiles for devices, associated with different sub-networks, that share the same private IP address. The system may analyze the characteristics of packets transmitted by a device to identify elements for mapping to a corresponding profile. The characteristics may include for example, a source IP address and a network identifier corresponding to a packet.

One or more embodiments described in this Specification and/or recited in the claims may not be included in this General Overview section.

2. Architectural Overview

Figure 1:
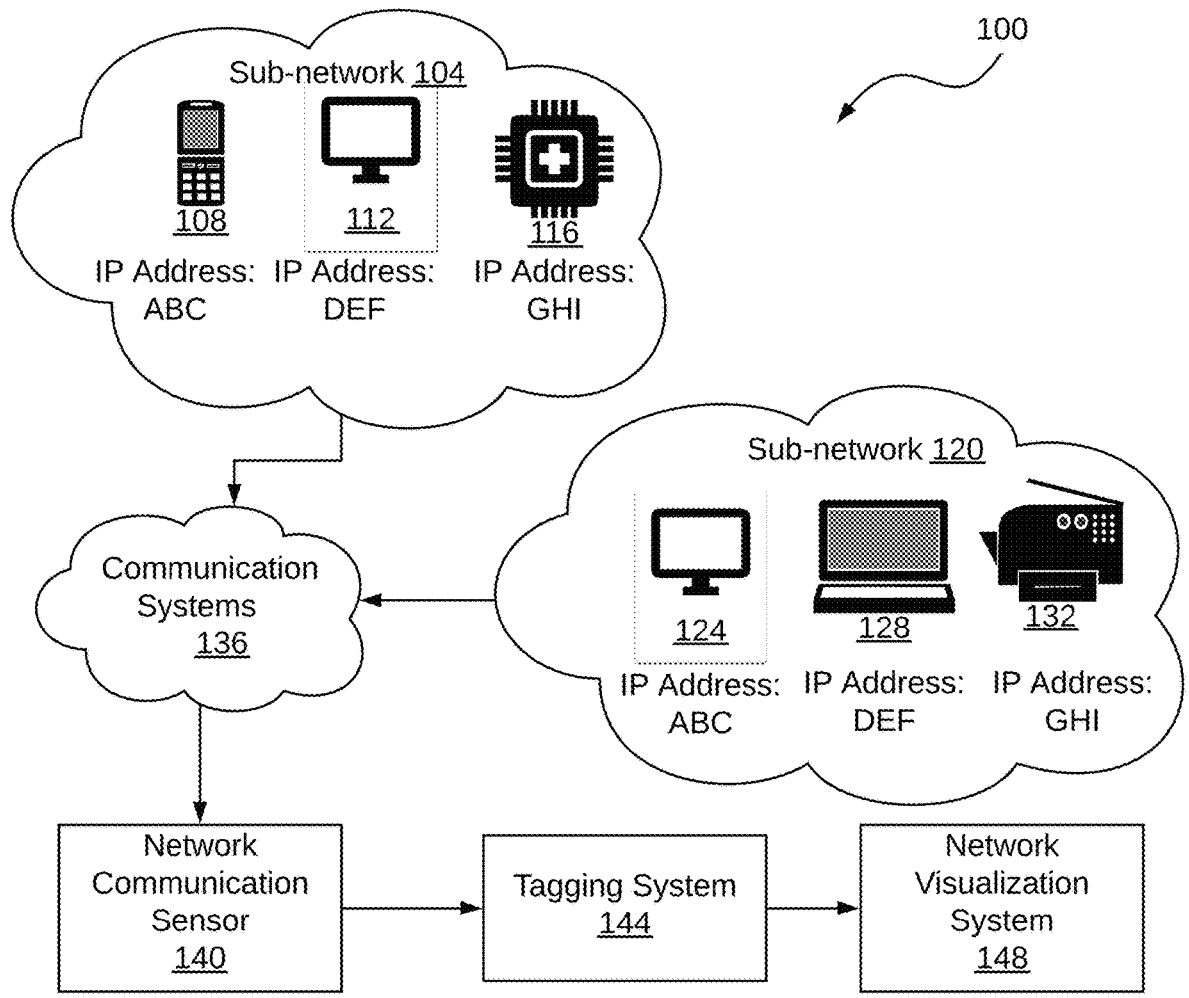
FIG. 1 illustrates a merged network environment formed from two merged private networks in accordance with one or more embodiments.

FIG. 1 illustrates a merged network environment 100 in accordance with one or more embodiments. As illustrated in FIG. 1, merged network environment 100 includes a first private sub-network 104, a second private sub-network 120, communications systems 136, network communication sensor 140, a tagging system 144, and a network visualization system 148. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As will be appreciated, the merged network environment 100 is provided for convenience of illustration and may represent a variety of different private network configurations in which different devices may share a same private IP address. For example, the first private sub-network 104 and the second private sub-network 120 may be associated with different sub-networks within a same organization. Alternatively, the first private sub-network 104 and the second private sub-network 120 may be associated with networks corresponding to different organizations that have merged and also consolidated their previously distinct networks.

The sub-network 104 includes a mobile phone 108 with corresponding private IP address ABC, a desktop computer 112 with corresponding private IP address DEF, and a networked medical device 116 with corresponding private IP address GHI.

The sub-network 120 includes a desktop computer 124 with corresponding private IP address ABC, a mobile computing device 128 with corresponding private IP address DEF, and a networked multi-function device 132 with corresponding private IP address GHI.

The merged network environment 100 thus presents the challenge described above, namely the duplication of private IP addresses within a private communication network. As shown, the mobile phone 108 of the sub-network 104 has the same private IP address (ABC) as the desktop computer 124 of the sub-network 120. Similarly, the desktop computer 112 of the sub-network 104 has the same private IP address (DEF) of the mobile computing device 128 of the sub-network 120. The networked medical device 116 of the sub-network 104 has the same private IP address (GHI) as the networked multi-function device 132 of the sub-network 120.

The communication systems 136 facilitate the transmission of packets between devices of the merged network environment 100. Elements of the communication systems 136 include, but are not limited to, routers, switches, bridges, hubs, gateways, servers, and/or data repositories. In some examples, the communication systems 136 enable communication between "end devices." End devices may be either a source and/or a destination of transmissions (e.g., data packets) and may include devices such as computers, printers, servers, smartphones, smart appliances, security cameras, networked medical equipment, networked manufacturing machines, networked sensors, and/or "internet of things" ("IoT") devices.

These elements of the communications systems 136 may apply techniques associated with the transport layer of the TCP/IP protocol to properly transmit and route packets to and from the devices of the private sub-networks 104, 120 despite the duplicative private IP addresses. However, the system may employ one or more of the following techniques to accurately visualize the sub-networks 104, 120 within the context of the merged network environment 100. Additional embodiments and/or examples relating to computer networks are described below in Section 5, titled "Computer Networks and Cloud Networks."

The network communication sensor 140 includes systems that may observe and/or copy packets transmitted via the communications systems 136. In some examples, the network communication sensor 140 may be configured as a Test Access Point (TAP) or a Switched Port Analyzer (SPAN). In examples in which a TAP (or other passive packet duplication systems) is used, the network communication sensor 140 may passively split transmission signals received through a particular port. The network communication sensor 140 then forwards the traffic to at least two ports: one port associated with the intended destination of the traffic, and a monitoring port. Data packets received at the monitoring port of the sensor may be analyzed. In examples in which a SPAN is used, the network communication sensor 140 transmits the packets to a SPAN port (also known as a mirror port), which duplicates the packets and forwards one set of the duplicated packets for further analysis.

Regardless of the technique or system used, packets copied by the network communication sensor 140 are forwarded to the tagging system 144 and network visualization system 148 for further processing and analysis.

In one or more embodiments, the network communication sensor 140 may be placed in communication with a distribution layer of the merged network environment 100. Since the distribution layer processes traffic between sub-networks (e.g., sub-networks 104, 120), virtual local area networks (VLANs), and/or broadcast domains of the network, the network communication sensor 140 that is in communication with the distribution layer may be able to capture a significant portion of all traffic in the network.

In other embodiments, the network communication sensor 140 may be attached to additional or alternative layers of the network hierarchy. For example, the network communication sensor 140 may be in communication with one or more core network devices (e.g., a switch, a router of the communication systems 136), and/or one or more access network devices (e.g., a hub or access server of the communication systems 136).

Packets forwarded by the network communication sensor 140 to the tagging system 144 are analyzed by the tagging system to determine the sub-network from which the packets originate. The tagging system 144 may then apply a label to the packets indicating the origin sub-network.

In some examples the tagging system 144 may determine a source sub-network of a packet by analyzing one or more attributes associated with the packet. In some examples, this may include an IP address. However, as indicated above, some IP addresses may be duplicated between different sub-networks 104, 120. This duplication of IP addresses may render the use of an IP address alone insufficient for identifying a source sub-network. In some cases, the tagging system 144 may use additional packet attributes to identify a source (e.g., a source device, a source sub-network, or both) of a transmission. Example attributes that may be used include, but are not limited to:

(a) Flow attributes: attributes associated with a flow of a communication session, including attributes associated with an Internet Protocol (such as, Internet Protocol version 4 (IPv4), Internet Protocol version 6 (IPv6)) used by a communication session;

(b) DNS attributes: attributes associated with a Domain Name System (DNS) protocol used by a communication session;

(c) DHCP attributes: attributes associated with a Dynamic Host Configuration Protocol (DHCP) used by a communication session;

(d) DICOM attributes: attributes associated with a Digital Imaging and Communications in Medicine (DICOM) protocol used by a communication session;

(e) POCT attributes: attributes associated with a Point of Care Testing (POCT) protocol used by a communication session;

(f) CIP attributes: attributes associated with a Common Industrial Protocol (CIP) used by a communication session;

(g) SIP attributes: attributes associated with a Session Initiation Protocol (SIP) used by a communication session;

(h) RTSP attributes: attributes associated with a Real Time Streaming Protocol (RTSP) used by a communication session; and/or (i) BACnet attributes: attributes associated with a Building Automation and Control network (BACnet) protocol used by a communication session.

Attributes associated with a flow of a communication session may also include any of: a source address (such as an IP address and/or a Media Access Control (MAC) address); a destination address; a source port; a destination port; a number of transmitted bytes; a number of received bytes; a source subnet; and a destination subnet.

Attributes associated with a particular protocol (such as, IPv4, IPv6, DNS, DICOM, POCT, CIP, SIP, RTSP, DHCP, and BACnet) include values for standard fields specified and/or defined by a corresponding protocol specification. The standard fields may be included in a header, tail, and/or other portion of a data packet.

As an example, standard fields in an IPv4 data packet include any of: Internet Protocol Version; Internet Header Length; Differentiated Services Code Point (DSCP); Explicit Congestion Notification (ECN); Total Length; Identification (for example, for identifying the group of fragments of a single IP datagram); Flags; Fragment Offset; Time to Live (TTL); Protocol (for example, for defining the protocol used in the data portion of the IP datagram); Header Checksum; Source Address; Destination Address; and Options. Additional and/or alternative standard fields may be used. A value for a standard field in an IPv4 data packet may be a value for an attribute of a communication session.

As another example, standard fields in a DNS query or response include any of: Identification; Flags; Number of Questions; Number of Answers; Number of Authority Resource Records (RRs); Number of Additional RRs; Request Type. Additional and/or alternative standard fields may be used. A value for a standard field in a DNS query or response may be a value for an attribute of a communication session.

As another example, standard fields in a DHCP packet include any of: MAC address; IP address; subnet; host name; DHCP Options; DHCP Class Identifier; Manufacturer; DHCP Parameter List; and DHCP Vendor Class. Additional and/or alternative standard fields may be used. A value for a standard field in a DHCP data packet may be a value for an attribute of a communication session.

As another example, DICOM is a protocol for the communication and management of medical imaging information and related data. Standard fields in a DICOM data packet include any of: Creation Time; Manufacturer; Institution Name; Referring Physician's Name; Consulting Physician's Name; Operator's Name; Warning Reason; Failure Reason; Patient's Name; Patient Identifier; Patient's Birth Date; Patient's Sex; Image Size. Additional and/or alternative standard fields may be used. A value for a standard field in a DICOM data packet may be a value for an attribute of a communication session.

Additionally or alternatively, an attribute of a communication session may include statistics and/or characteristics of the communication session. For example, attributes may include any of: a number of data packets in the communication session; a number of communication sessions that share a common set of attribute values; a frequency of communication sessions that share a common set of attribute values; a duration of the communication session; and whether or not the communication session is secure.

Any one or more of the attributes above may be used by the tagging system 144 to identify a source sub-network of a packet. Once identified, the tagging system 144 may associate a particular set of attributes with a source sub-network in a profile. The tagging system may then apply a label or tag to a packet indicating its source sub-network, thereby providing an abbreviated, concise, and easily analyzed indication of the sub-network associated with the packet to be detected by the network visualization system 148.

The network visualization system 148 may receive the packets tagged with a source sub-network identifier and generate a visualization of a network environment as a whole, including any constituent sub-networks, and corresponding devices with the constituent sub-networks. This visualization of the various components and devices of the network as a whole may improve various network administration functions, some of which are described above.

Upon receiving the tagged packets, the network visualization system 148 may detect, within the tagged data packets, a private IP addresses associated with a source device of the data packets and a tag or label indicating the source sub-network. Detecting both the private IP address and the identity of the source sub-network enables the network visualization system 148 to distinguish between devices communicating from distinct sub-networks In some embodiments, the network visualization system 148 may detect other management data associated with the packets that may be used for network administration. These other management data may include various attributes, such as those described above, that may be correlated with a device profile. The attributes and profile may, together, be used to uniquely identify a device within the network environment 100 regardless of the private IP address.

The network visualization system 148 may display a visual representation of the network environment 100 as a whole. This visual representation includes distinct interface elements that correspond to distinct sub-networks, in this case sub-network 104 and sub-network 120. Because the visual representation generated by the network visualization system 148 displays distinct interface elements for constituent sub-networks in a single display, the single visual representation may be referred to as a combined visual representation for convenience.

In some examples, the network visualization system 148 may display representations corresponding to constituent devices within each sub-network interface element. For example, the network visualization system 148 may generate a distinct interface for the sub-network 104 that identifies the device 108, 112, 116 with respective private IP addresses ABC, DEF, and GHI. The separate interface elements for each sub-network prevents ambiguity regarding duplicated private IP addresses.

Figure 2:
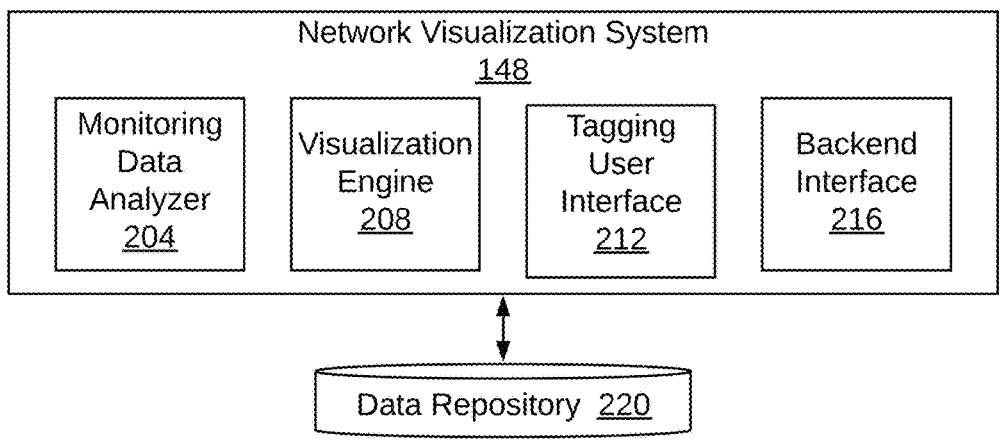
FIG. 2 illustrates a system for tagging monitoring data to distinguish between devices in a private network sharing a same internet protocol (IP) device and visualizing devices connected to the private network in accordance with one or more embodiments.

The network visualization system 148 is illustrated in more detail in FIG. 2. In the example illustrated, the network visualization system 148 includes a monitoring data analyzer 204, a visualization engine 208, a tagging user interface 212, and a backend interface 216.

The monitoring data analyzer 204 may receive data packets from the tagging system 144. Upon receiving the data packets, the monitoring data analyzer 204 may analyze the packets to determine the sub-network from which the packets originated (e.g., via the identifying tag applied by the tagging system 144), the private IP address of the source device, among other attributes. In some examples, it is the monitoring data analyzer 204 that analyzes data packets to identify various attributes. For example, the monitoring data analyzer 204 may detect a communication protocol associated with packets, a MAC address associated with a source device, among other attributes.

In some examples, the monitoring data analyzer 204 may map, for a particular set of one or more packets, identifying attributes to a profile associated with a source device from which the set of packets originated. For example, the monitoring data analyzer 204 may identify within a set of packets a private IP address and a sub-network identifier corresponding to the source of the packets. These may be associated with (or "mapped" to) a profile associated with a source device, where the source device is identified by a combination of its corresponding private IP address and sub-network identifier. In other examples, the monitoring data analyzer 204 may detect additional attributes and associate the additional attributes with the source profile. These attributes include MAC address, communication protocol, as well as other attributes, such as behavioral patterns associated with the source device. Behavioral patterns include average packet size, average payload size, times of day when packets are transmitted, data consumption rates, average inactive (e.g., sleep) times, among others.

The visualization engine 208 may generate a combined visual representation that depicts the network environment 100 as a whole. That is, the visual representation may include distinct interface elements, each of which corresponds to a distinct constituent sub-network (e.g., sub-networks 104, 120) of a network environment (e.g., network environment 100). Each of the distinct interface elements may further identify (optionally in response to user selection) devices, device attributes, and communication patterns associated with the various devices. Example user interface elements are described below in the context of FIGS. 4-9.

The tagging user interface 212 provides graphical functions in one or more of the distinct interface elements to apply a sub-network identification tag to a device, a packet, a set of packets, a communication session, and combinations thereof.

In one or more embodiments, tagging user interface 212 includes more general functions of a frontend interface that, whether embodied as hardware and/or software, is configured to facilitate communications between a user and network visualization system 148. That is, the tagging user interface 212 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of tagging user interface 212 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 184 is specified in one or more other languages, such as Java, C, or C++.

Backend interface 216 may include an API, CLI, or other interfaces for invoking functions to execute actions. One or more of these functions may be provided through cloud services or other applications, which may be external to the system 148. For example, one or more components of system 148 may invoke an API to access information stored in data repository 220, such as device profiles. As another example, an API in the backend interface 216 may enable communication with other elements of the network environment 100, such as communication systems 136. It will be appreciated considering these examples that the actions that are performed may vary from implementation to implementation.

In some embodiments, the system 148 may access external resources, such as cloud services. Example cloud services may include, but are not limited to, social media platforms, email services, short messaging services, enterprise management systems, data storage systems, virtualized communication interfaces, and other cloud applications. Backend interface 216 may serve as an API endpoint for invoking a cloud service. For example, backend interface 216 may generate outbound requests that conform to protocols ingestible by external resources. Backend interface 216 may process and translate inbound requests to allow for further processing by other components of the system 148. The backend interface 216 may store, negotiate, and/or otherwise manage authentication information for accessing external resources. Example authentication information may include, but is not limited to, digital certificates, cryptographic keys, usernames, and passwords. Backend interface 216 may include authentication information in the requests to invoke functions provided through external resources.

In one or more embodiments, the network visualization system 148 may be in communication with a data repository 220. The data repository 220 is any type of storage unit and/or device (e.g., a file system, database, collection of tables, or any other storage mechanism) for storing data. Further, a data repository 220 may include multiple different storage units and/or devices. The multiple different storage units and/or devices may or may not be of the same type or located at the same physical site. Further, a data repository 220 may be implemented or may execute on the same computing system as the data repository 220. Alternatively or additionally, a data repository 220 may be implemented or executed on a computing system separate from the data repository 220. A data repository 104 may be communicatively coupled to the data repository 220 via a direct connection or via a network.

Information describing the data repository 220 may be implemented across any of components within the system 100.

In one or more embodiments, the network visualization system 148 refers to hardware and/or software configured to perform operations described herein for generating one or more combined visual representations of private sub-networks in communication with a network environment, in which multiple devices share a same IP address. Examples of operations and example visual representations (e.g., user interfaces and user interface elements) for visualizing sub-networks and their corresponding devices are described below with reference to FIGS. 3-9.

In an embodiment, the network visualization system 148 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 3:
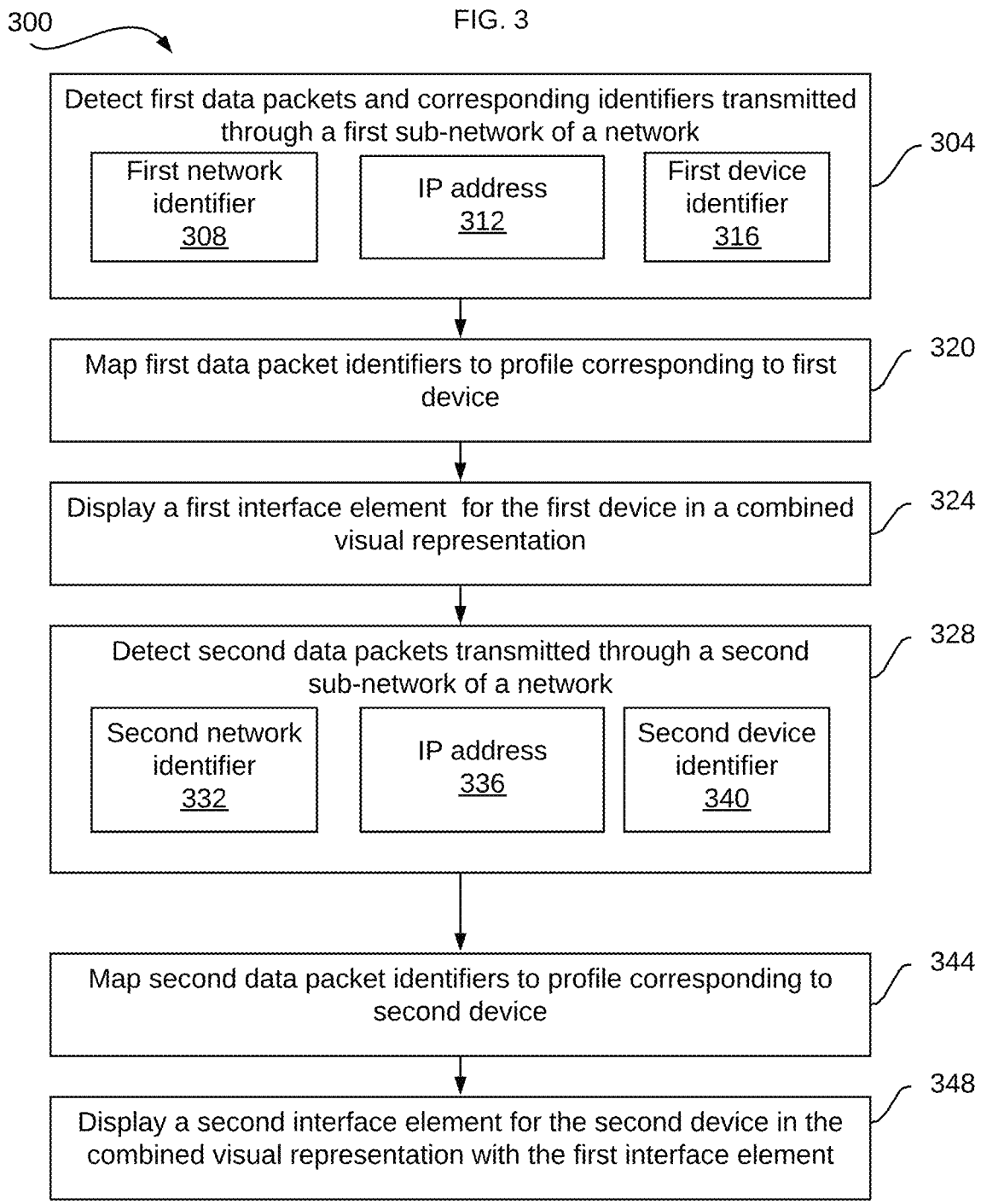
FIG. 3 illustrates an example set of operations for visualizing devices in different sub-networks, some of which may have duplicative private IP addresses, and that are connected to a private network in accordance with one or more embodiments.

3. Generating and Displaying a Combined Visual Representation of a Network with Multiple Constituent Sub-Networks FIG. 3 illustrates an example set of operations, referred to collectively as a method 300, for analyzing packets transmitted through a private network, in accordance with one or more embodiments. The method 300 may generate a combined visual representation of multiple sub-networks within the private network, in accordance with one or more embodiments. As described herein, the example set of operations also enable devices in sub-networks with duplicative private IP addresses to be distinguished from one another in one or more visual displays. One or more operations illustrated in FIG. 3 may be modified, rearranged, or omitted all together. Accordingly, the particular sequence of operations illustrated in FIG. 2 should not be construed as limiting the scope of one or more embodiments.

The method 300 may begin by detecting a first set of data packets transmitted through a first sub-network of a private network (operation 304). The mechanisms for detecting the first set of data packets are described above in the context of FIG. 1 and may include using a TAP, a SPAN, or other similar network traffic monitoring technique.

As also described above, the operation 304 includes detecting and/or identifying various attributes associated with the data packets of the first set of data packets. These attributes may be used to uniquely identify not only the sub-network from which the data packets originated, but also the device from which the data packets originated.

While many possible attributes detected in operation 304 are described above in the context of FIG. 1, three example attributes are specifically identified in FIG. 3 for convenience of illustration. The attributes may include a first network identifier 308, a device IP address 312, and a first device identifier 316. These three attributes illustrate only one combination of many different combinations of attributes that maybe detected in the operation 304.

The first network identifier 308 includes a tag, label, or other indicator that is applied to or otherwise associated with the packets of the first set. The first network identifier 308 is used to identify the origin sub-network in preparation for generating a combined visual display of sub-networks within a network environment. This label enables duplicative IP addresses for different devices to be used in distinct sub-networks of a common private network so that an accurate visualization of the network and constituent sub-networks may be generated.

The first network identifier ("tag" or "label") may be associated with an IP address and not with a device. In this way, a device with a tagged IP address is moved to another network may still be associated with a profile (described below) for the device, thereby maintaining continuity of identification for the method 300 (and other embodiments described herein).

In some examples, an administrator may use the first network identifier 308 to designate the sub-network and the devices connected thereto. In other words, the first network that is associated with the first network identifier 308 need not be a physical network or a logical network. In some cases, the first network identifier 308 may simply correspond to a group of devices that an administrator associates with one another. An administrator may select devices as components of these "convenience" or "constructive" networks for criteria beyond physical and/or topological reasons.

The IP address 312 is the private internet protocol device associated with the packet that may be used to identify a device from which the packet originates. As described above, the IP address 312 may be unique to a particular sub-network but is not globally unique. Therefore, the IP address 312, associated with a device in a first private sub-network within a network environment, may be duplicative of one or more additional devices in one or more corresponding private sub-networks in communication with the same network environment as the first private sub-network.

In some examples, the first device identifier 316 may include a unique identifier, such as a MAC address. In other examples, a combination of device attributes may be used to form a first device identifier. For example, a combination of a device manufacturer serial number and an operating system version number may be used collectively as the first device identifier 316. In other examples, a pattern of behavior exhibited by the device may be associated with a system (or administrator) assigned unique device identifier that is used to uniquely identify the device. For example, patterns in data usage over time, computing application usage, computing application versions, server requests, among others, may be characteristic of a device.

Once the first set of packets are detected, the system may associate, store, or otherwise "map" the identifiers of the first set of data packets to a first profile corresponding to the first device that originated the data packets (operation 320). In one example, the profile stores the network identifier 308 and the IP address 312 in the profile associated with the first device. These two data may be, at a minimum, to distinguish between devices in separate sub-networks of a private network having duplicative IP addresses. A device identifier, such as the device identifier 316, may also be associated with the profile for convenience.

The system may then display a first interface element that represents, and visually presents, (1) the sub-network from which the first set of data packets originated and (2) the first device within the sub-network (operation 324).

At a high level, presenting the first interface element that includes a representation of the first sub-network and representations of the devices associated with the first sub-network (e.g., the first device) improves the efficiency and convenience of a variety of network administration functions. For example, representing sub-networks and associated devices in separate interface elements enables a network administrator to more conveniently perform device inventory operations, device security auditing, and device service agreement compliance auditing. Absent an embodiment of the combined visual representation described herein, executing inventory, auditing, and other administrative functions for networks that include duplicative IP addresses is time consuming and prone to error.

Continuing with the method 300, the system continues monitoring network traffic until a second set of packets originating from a second sub-network within the same network environment as the first sub-network are detected (operation 328). Similar to the preceding operations 304 to 324, the packets of the second set of packets may originate from a second device and be identified using various attributes. These attributes may include any of those indicated above. In particular, the system may detect packet attributes that include, but are not limited to, a second network identifier 332, an IP address 336, and a second device identifier 340.

In some examples, the IP address 336 for the second device in the second sub-network is the same as the IP address 312 for the first device in the first sub-network. As indicated above, while network infrastructure devices like routers employ techniques to properly route packets from different devices having the same (duplicated) IP addresses, no analogous techniques exist for network administration functions. This complicates the work of maintaining device inventories and performing other network administration functions.

These attributes 332, 336, and 340 detected in the second set of data packets originating from the second sub-network are used by the system in ways analogous to the attributes detected in the first set of data packets. Namely, the attributes 332, 336, and 340 are used to identify the second packets as originating from a second sub-network within the same private network as the first sub-network. Furthermore, the attributes 332, 336, and 340 may be used to uniquely identify a device generating the second set of packets.

As described above in the context of operation 320, the attributes used to identify the origin second sub-network and device of the second set of data packets are mapped to a profile corresponding to the second device (operation 344).

The system may then display a second interface element for the second device and second sub-network along with the first interface element for the first device and first sub-network in the combined visual representation (operation 348). In this way, the system visually represents the constituent sub-networks and their corresponding devices.

As described herein, embodiments of this visual representation may be used to administer and maintain a network. Even though the first device and the second device in this example have a same private IP address, the system-generated visual representation using the network identifier and IP address (optionally among others) allows these devices to be visually distinguishable from one another in the combined visual representation.

4. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

FIGS. 4-9 illustrate various example embodiments of visual representation generated using the techniques described above. In some examples, one or more embodiments display information related to multiple sub-networks within a private network environment in which different devices in different sub-networks have a same IP address.

FIG. 4 illustrates an example user interface 400. This example user interface 400 presents a list of sub-networks that are components (or "constituents") of a same network (also referred to as a "network environment"). The example user interface 400 includes an index number 404, a sub-network identifier 408, a sub-network short name 412, and a sub-network long name 416.

The index number 404 simply identifies a list position for each sub-network. An index number may improve the readability and communication of some embodiments of the display 400, particularly those that include many different sub-networks.

The sub-network identifier 408, labeled in FIG. 4 as the "domain ID" is a system-recognized identifier associated with a corresponding sub-network. In some examples, the sub-network identifier 408 may correspond to a label used by the system in FIG. 3 that is applied to packets to indicate a source sub-network (i.e., network identifiers 308, 332).

The sub-network short name 412 and sub-network long name 416 may include readable labels that are provided for the convenience of administrators and/or users.

This user interface 400 provides information to an administrator regarding the identities of constituent sub-networks and their corresponding system-applied labels and colloquial names more conveniently used and remembered by administrators.

The example user interface 500 lists network sensors associated with different sub-networks. More specifically, the example user interface 500 identifies the IP address of the network sensor 504, a sub-network identifier 508, and a sub-network short name 512.

At a high level, the example user interface 500 coordinates an identify of a network sensor (e.g., the IP address of the network sensor 504) and one or more labels used to identify a sub-network to which an identified network sensor is connected (e.g., a sub-network ID 508 and/or a sub-network name 512).

This user interface 500 enables an administrator to identify particular network sensors (e.g., devices associated with TAPs and/or SNAPs) that are connected to particular corresponding sub-networks within a network environment. This in turn may improve the distinction between devices that share a same IP address. For example, a network administrator may identify a source network of data packets having a duplicative IP address by understanding (1) which network sensor is detecting a particular set of data packets and (2) the sub-network to which the network sensor is connected. In this way, the example user interface 500 provides data regarding network sensors and network topology that may be used by an administrator to identify a source sub-network with which a device communicates.

FIG. 6 illustrates an example sensor tagging user interface 600 that enables an administrator to apply a sub-network identifier to a particular set of data packets. The system may subsequently apply a tag to packets according to the designated rule, thereby identifying a sub-network source of the data packets despite a duplicative device IP address. That is, an administrator may create a rule in the example user interface 600 that applies a sub-network identifying label to data packets based on one or more attributes specified in the rule.

The example interface 600 includes sensor information 604, a tag selector 608, a packet attribute selector 612, and a packet attribute selection interface 616. Using the example interface 600, an administrator may use the sensor information 604 to uniquely identify a sensor in a network environment. For example, an administrator may use the sensor information 604 (e.g., a sensor name or "label," a sensor MAC address, an IP address associated with a gateway device to which the sensor is in communication with) to identify the sub-network to which the sensor is in communication with. In one example, an administrator may identify the sub-network associated with the sensor by using information displayed in the example user interface 500. An administrator may then establish a rule using the interface elements 608, 612, and 616. The rule, when established, may subsequently apply a tag to packets identifying the origin sub-network based on the one or more attributes specified in the rule by interface element 616.

In one example, the "apply tag" field 608 may be used to apply a tag to data packets indicating a particular sub-network for packets with one or more particular attributes selected using the attribute selection interface 616. Example attributes include an IP address associated with an origin device of the packet(s), which may be duplicative, and a sub-network identifier. Other attributes may optionally be selected in the attribute selection interface 616, such as those described above.

Example user interfaces 700 in FIG. 7A and 704 in FIG. 7B illustrates full network environment and individual sub-network device inventories, respectively, according to some embodiments of the present disclosure.

The example user interface 700 illustrated in FIG. 7A is a device inventory for a full network environment that, by employing the techniques described herein, visually distinguishes between different devices even though they have a same IP address. For one or more devices in communication with a network environment (e.g., that includes one or more sub-networks), the example user interface 700 includes an index number 708, a device MAC address 712, an IP address 716, and a sub-network identifier 720.

The index number 708 simply identifies a list position in the user interface 700. The MAC address 712 is a unique device identifier described above.

As shown in this example, the IP addresses 716 of the devices listed in the example user interface 700 are all the same (192.168.107.230). However, other features of the example user interface 700, namely the MAC address 712 and the sub-network identifier 720 enable these different devices to be distinguished from one another despite sharing an IP address. As described above, the example user interface 700 thus enables a network administrator to effectively execute various management functions, such as inventory and auditing functions, that would otherwise be frustrated by the presence of duplicative IP addresses.

The example user interface 704 illustrated in FIG. 7B enables a display of devices in communication with a single, particular subnetwork. In some examples, the example user interface 704 may be selected via the example user interface 700.

Figure 8:
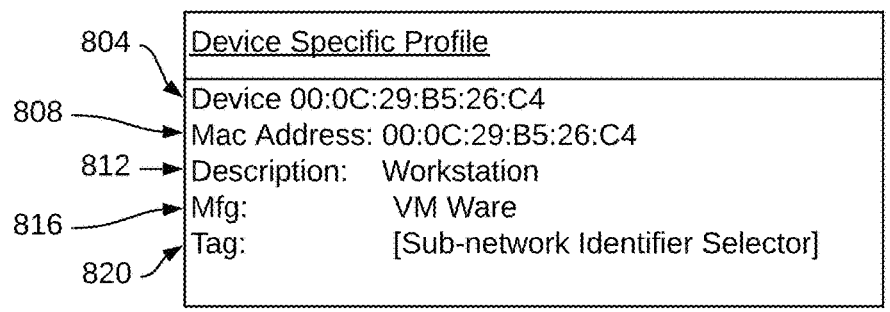
FIG. 8 is a schematic illustration of a user interface element in a network visualization system that presents a device profile and further enables a tag to be applied that identifies a sub-network to which the device is connected in accordance with one or more embodiments.
Figure 9:
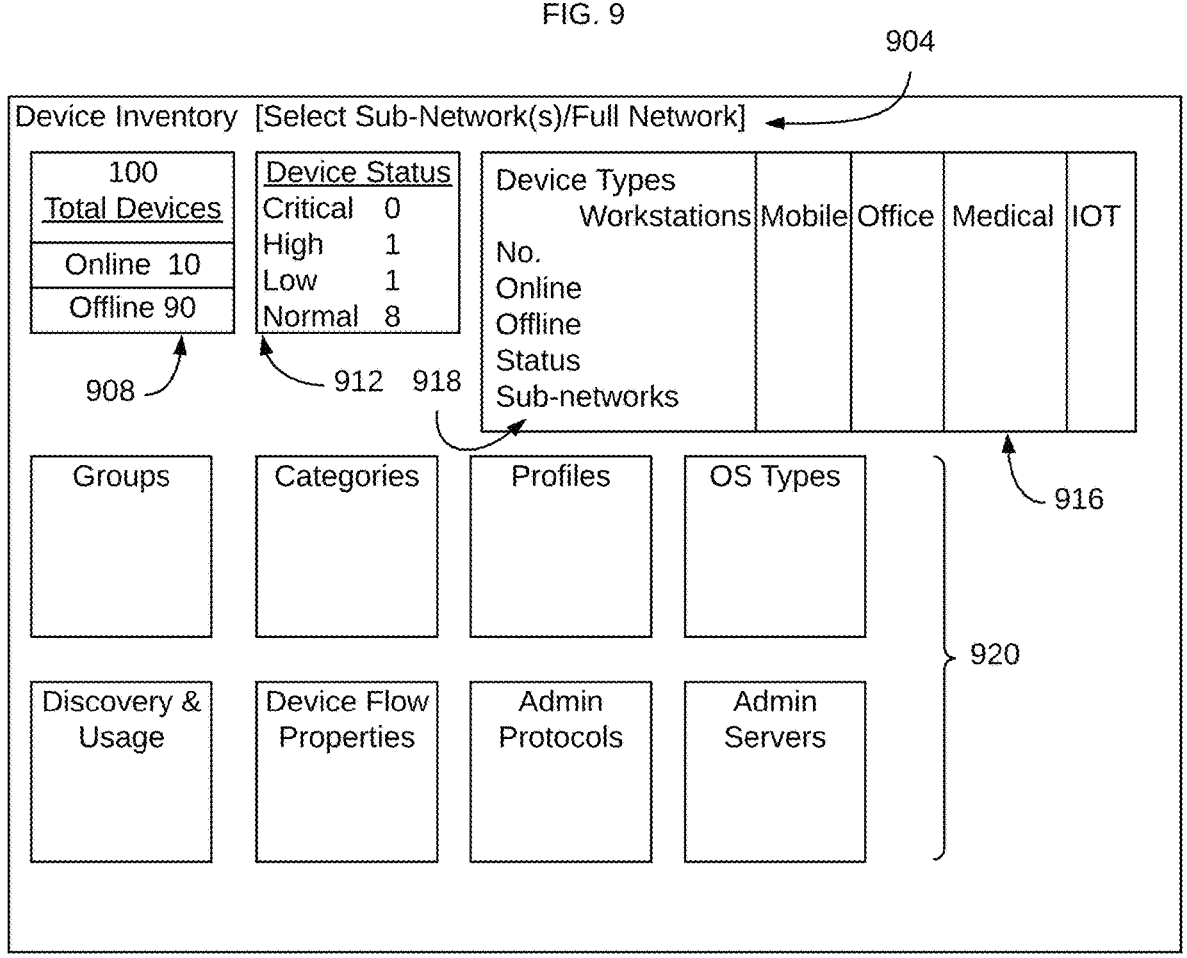
FIG. 9 is a schematic illustration of a user interface element in a network visualization system that presents various device inventory data related to network administration.

The example user interface 800 illustrated in FIG. 8 displays attributes and/or identifying information associated with a specific device, in accordance with some embodiments of the present disclosure. The example user interface 800 includes a device identifier 804, a MAC address 808, a device description 812, a device manufacturer 816, and a sub-network identifier tag ("label") selector 820. Using the example user interface 800, an administrator may manually apply a tag to a particular device that indicates a sub-network that the particular device is in communication with.

For example, one or more of the device identifier 804, MAC address 808, device description 812, and/or device manufacturer 816 may be used to uniquely identify a device. Other attributes and/or behavioral patterns may also be presented in the example user interface 800 so as to identify a device. Using any of preceding techniques, user interface displays, and/or understanding of a network topology, an administrator may manually use the sub-network identifier tag selector 820 to associate a particular device (e.g., device with MAC address 808) with a particular constituent sub-network of a network with multiple sub-networks.

The example user interface 800 may be accessed via one or both of the user interfaces 700 and/or 704.

The example user interface 900 illustrates a device inventory interface that displays various characteristics of a particular network and/or sub-network within the particular network, in accordance with some embodiments. A network/sub-network selector 904 may be used to identify a network and/or sub-network to display in the remaining elements of the user interface 900.

The example user interface 900 may include various elements, such as a device count element 908, a device status 912, a device type inventory 916, and network device attribute summaries 920.

In some cases, the various attributes, counts, and statuses illustrated in the example user interface 900 may be incomplete or otherwise inaccurate because devices from different sub-networks within a network environment may have duplicative IP addresses. However, in this case, using the tags described above, the example user interface may accurately depict connected devices and summarize the collections of their various attributes.

In fact, the systems and techniques described above may even analyze the tags applied to packets so that a number of various different types of devices associated with each sub-network may be enumerated in a device type sub-network count 918 of the device type inventory 916.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
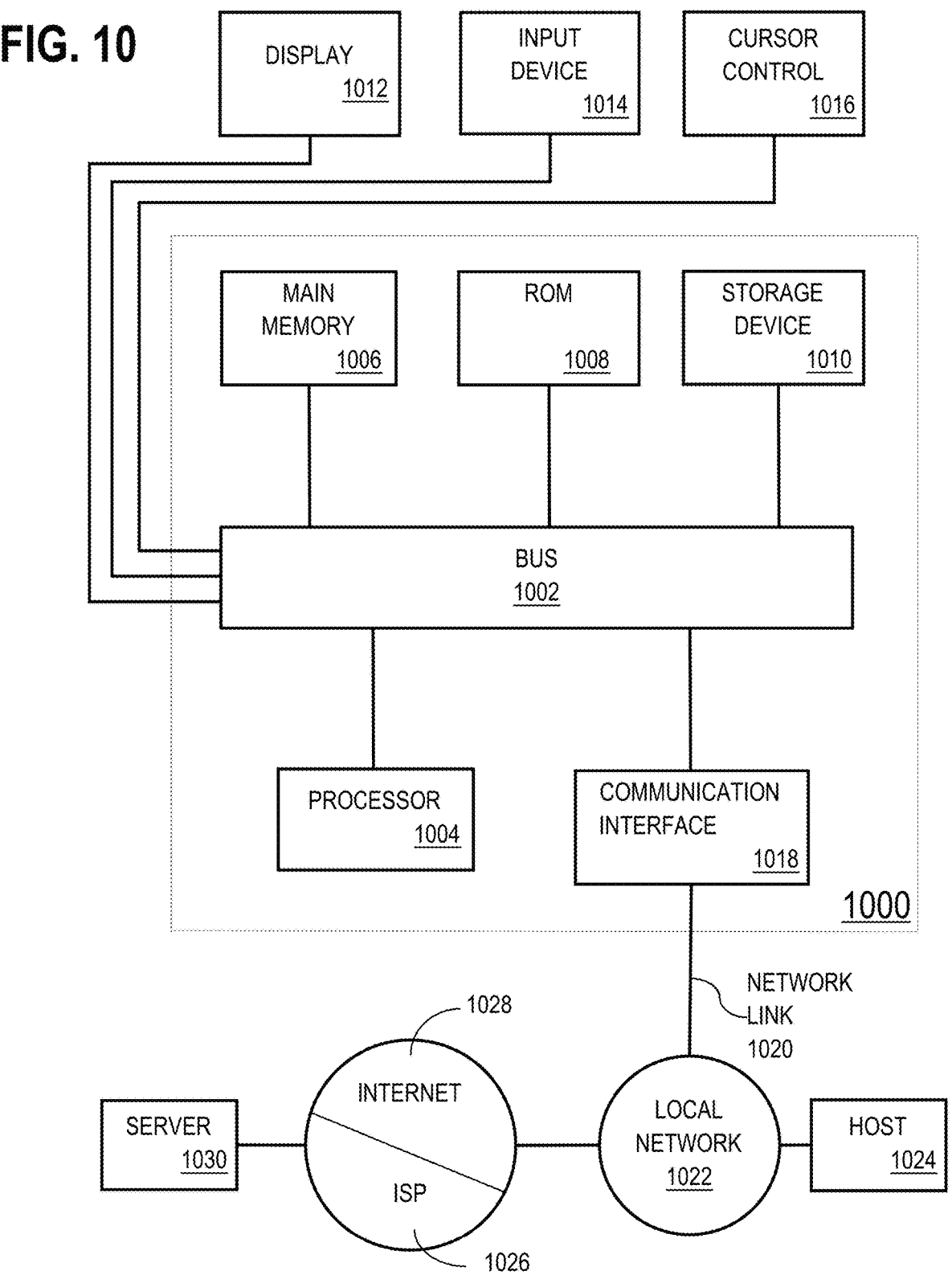
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
   generating a combined visual representation of a first set of devices in a first sub-network of a network and a second set of devices in a second sub-network of the network, wherein at least one device in the first sub-network and at least one device in the second sub-network are each associated with a same private internet protocol (IP) address;
   receiving, by a network communication sensor, a first set of data packets communicated through the first sub-network of the network, the first set of data packets (a) comprising a particular IP address as a source IP address of the first set of data packets, (b) comprising a first network identifier that identifies the first sub-network, and (c) originating from a first device on the first sub-network;
   transmitting, by the network communication sensor, (a) a first instance of the first set of data packets to an intended destination of the first set of data packets and (b) a second instance of the first set of data packets to a tagging system in the network;
   determining, by the tagging system based on one or more attributes of the first set of data packets, that the first sub-network is a source of the first set of data packets;
   responsive to determining that the first sub-network is the source of the first set of data packets: applying, by the tagging system, a first label comprising the first sub-network identifier to at least one packet in the first set of packets;
   mapping a first combination of identifiers comprising at least the (a) the particular IP address and (b) the first network identifier to a first profile for the first device;
   displaying, within the combined visual representation, a first interface element for the first device based on the first profile;
   receiving, by the network communication sensor, a second set of data packets communicated through the second sub-network of the network, the second set of data packets (a) comprising the particular IP address as a source IP address of the second set of data packets, (b) comprising a second network identifier that identifies the second sub-network, and (c) originating from a second device on the second sub-network;
   transmitting, by the network communication sensor, (a) a first instance of the second set of data packets to an intended destination of the second set of data packets and (b) a second instance of the second set of data packets to the tagging system in the network;
   determining, by the tagging system based on one or more attributes of the second set of data packets, that the second sub-network is a source of the second set of data packets;
   responsive to determining that the second sub-network is the source of the first set of data packets: applying, by the tagging system, a second label comprising the second sub-network identifier to at least one packet in the second set of packets;
   mapping a second combination of identifiers comprising at least the (a) the particular IP address and (b) the second network identifier to a second profile for the second device;
   displaying, within the combined visual representation concurrently with the first interface element, a second interface element for the second device based on the second profile.

2. The media of claim 1, further comprising using the combined visual representation to assign a third network identifier to a third profile corresponding to a third device, wherein the third device profile comprises the particular IP address as a source IP address for a third set of data packets.

3. The media of claim 1, wherein:
   the first interface element displays a first set of additional devices associated with the first sub-network in addition to the first device;
   the second interface element displays a second set of additional devices associated with the second sub-network in addition to the second device; and
   wherein the first set of additional devices and the second set of additional devices do not have any devices in common.

4. The media of claim 3, wherein at least one additional device of the first set of additional devices associated with the first sub-network and at least one additional device of the second set of additional devices associated with the second sub-network share a same IP address.

5. The media of claim 1, wherein the first profile for the first device comprises a plurality of first attributes that includes one or more of a media access control address associated with the first device, a communication protocol associated with the first set of data packets communicated from the first device, and dynamic host configuration protocol values associated with a communication session within which the first set of data packets were communicated.

6. The media of claim 5, further comprising using the first profile and the second profile to identify the first device as different from the second device despite sharing the same private IP address.

7. The media of claim 1, further comprising assigning the first network identifier to the first set of data packets based on one or more parameters comprising:
   (a) an identifier of a first sensor used to detect the first set of data packets;
   (b) a network location of the first sensor used to detect the first set of data packets;
   (c) a sub-network identifier applied to the first set of data packets; and
   (d) an identifier associated with a virtual local area network used to communicate the first set of data packets.

8. A method comprising:
   generating a combined visual representation of a first set of devices in a first sub-network of a network and a second set of devices in a second sub-network of the network, wherein at least one device in the first sub-network and at least one device in the second sub-network are each associated with a same private internet protocol (IP) address;
   receiving, by a network communication sensor, a first set of data packets communicated through the first sub-network of the network, the first set of data packets (a) comprising a particular IP address as a source IP address of the first set of data packets, (b) comprising a first network identifier that identifies the first sub-network, and (c) originating from a first device on the first sub-network;

transmitting, by the network communication sensor, (a) a first instance of the first set of data packets to an intended destination of the first set of data packets and (b) a second instance of the first set of data packets to a tagging system in the network;

determining, by the tagging system based on one or more attributes of the first set of data packets, that the first sub-network is a source of the first set of data packets;

responsive to determining that the first sub-network is the source of the first set of data packets: applying, by the tagging system, a first label comprising the first sub-network identifier to at least one packet in the first set of packets;

mapping a first combination of identifiers comprising at least the (a) the particular IP address and (b) the first network identifier to a first profile for the first device;

displaying, within the combined visual representation, a first interface element for the first device based on the first profile;

receiving, by the network communication sensor, a second set of data packets communicated through the second sub-network of the network, the second set of data packets (a) comprising the particular IP address as a source IP address of the second set of data packets, (b) comprising a second network identifier that identifies the second sub-network, and (c) originating from a second device on the second sub-network;

transmitting, by the network communication sensor, (a) a first instance of the second set of data packets to an intended destination of the second set of data packets and (b) a second instance of the second set of data packets to the tagging system in the network;

determining, by the tagging system based on one or more attributes of the second set of data packets, that the second sub-network is a source of the second set of data packets;

responsive to determining that the second sub-network is the source of the first set of data packets: applying, by the tagging system, a second label comprising the second sub-network identifier to at least one packet in the second set of packets;

mapping a second combination of identifiers comprising at least the (a) the particular IP address and (b) the second network identifier to a second profile for the second device;

displaying, within the combined visual representation concurrently with the first interface element, a second interface element for the second device based on the second profile.

9. The method of claim 8, further comprising using the combined visual representation to assign a third network identifier to a third profile corresponding to a third device, wherein the third device profile comprises the particular IP address as a source IP address for a third set of data packets.

10. The method of claim 8, wherein:
the first interface element displays a first set of additional devices associated with the first sub-network in addition to the first device;
the second interface element displays a second set of additional devices associated with the second sub-network in addition to the second device; and
wherein the first set of additional devices and the second set of additional devices do not have any devices in common.

11. The method of claim 10, wherein at least one additional device of the first set of additional devices associated with the first sub-network and at least one additional device of the second set of additional devices associated with the second sub-network share a same IP address.

12. The method of claim 8, wherein the first profile for the first device comprises a plurality of first attributes that includes one or more of a media access control address associated with the first device, a communication protocol associated with the first set of data packets communicated from the first device, and dynamic host configuration protocol values associated with a communication session within which the first set of data packets were communicated.

13. The method of claim 12, further comprising using the first profile and the second profile to identify the first device as different from the second device despite sharing the same private IP address.

14. The method of claim 8, further comprising assigning the first network identifier to the first set of data packets based on one or more parameters comprising:
  (a) an identifier of a first sensor used to detect the first set of data packets;
  (b) a network location of the first sensor used to detect the first set of data packets;
  (c) a sub-network identifier applied to the first set of data packets; and
  (d) an identifier associated with a virtual local area network used to communicate the first set of data packets.

15. A system comprising:
at least one device including a hardware processor;
the system being configured to perform operations comprising:
generating a combined visual representation of a first set of devices in a first sub-network of a network and a second set of devices in a second sub-network of the network, wherein at least one device in the first sub-network and at least one device in the second sub-network are each associated with a same private internet protocol (IP) address;

receiving, by a network communication sensor, a first set of data packets communicated through the first sub-network of the network, the first set of data packets (a) comprising a particular IP address as a source IP address of the first set of data packets, (b) comprising a first network identifier that identifies the first sub-network, and (c) originating from a first device on the first sub-network;

transmitting, by the network communication sensor, (a) a first instance of the first set of data packets to an intended destination of the first set of data packets and (b) a second instance of the first set of data packets to a tagging system in the network;

determining, by the tagging system based on one or more attributes of the first set of data packets, that the first sub-network is a source of the first set of data packets;

responsive to determining that the first sub-network is the source of the first set of data packets: applying, by the tagging system, a first label comprising the first sub-network identifier to at least one packet in the first set of packets;

mapping a first combination of identifiers comprising at least the (a) the particular IP address and (b) the first network identifier to a first profile for the first device;

displaying, within the combined visual representation, a first interface element for the first device based on the first profile;

receiving, by the network communication sensor, a second set of data packets communicated through the second sub-network of the network, the second set of data packets (a) comprising the particular IP address as a source IP address of the second set of data packets, (b) comprising a second network identifier that identifies the second sub-network, and (c) originating from a second device on the second sub-network;

transmitting, by the network communication sensor, (a) a first instance of the second set of data packets to an intended destination of the second set of data packets and (b) a second instance of the second set of data packets to the tagging system in the network;

determining, by the tagging system based on one or more attributes of the second set of data packets, that the second sub-network is a source of the second set of data packets;

responsive to determining that the second sub-network is the source of the first set of data packets: applying, by the tagging system, a second label comprising the second sub-network identifier to at least one packet in the second set of packets;

mapping a second combination of identifiers comprising at least the (a) the particular IP address and (b) the second network identifier to a second profile for the second device;

displaying, within the combined visual representation concurrently with the first interface element, a second interface element for the second device based on the second profile.

16. The system of claim 15, wherein:

the first interface element displays a first set of additional devices associated with the first sub-network in addition to the first device; and the second interface element displays a second set of additional devices associated with the second sub-network in addition to the second device;

wherein the first set of additional devices and the second set of additional devices do not have any devices in common.

17. The system of claim 15, wherein the first profile for the first device comprises a plurality of first attributes that includes one or more of a media access control address associated with the first device, a communication protocol associated with the first set of data packets communicated from the first device, and dynamic host configuration protocol values associated with a communication session within which the first set of data packets were communicated.

18. The system of claim 17, the operations further comprising using the first profile and the second profile to identify the first device as different from the second device despite sharing the same private IP address.

19. The one or more non-transitory computer-readable media of claim 1, wherein identical sub-network identifiers are used for all devices in each respective sub-network of the network.

* * * * *